United States Patent [19]
Malcolm et al.

[11] Patent Number: 5,790,939
[45] Date of Patent: Aug. 4, 1998

[54] METHOD AND SYSTEM OF FRAME TIMING SYNCHRONIZATION IN TDMA BASED MOBILE SATELLITE COMMUNICATION SYSTEM

[75] Inventors: James Eryx Malcolm, Bethesda; Robert Carroll Marquart, Germantown, both of Md.

[73] Assignee: Hughes Electronics Corporation, El Segundo, Calif.

[21] Appl. No.: 496,737

[22] Filed: Jun. 29, 1995

[51] Int. Cl.$^6$ ..................................... H04B 7/19
[52] U.S. Cl. ........................... 455/13.2; 370/324
[58] Field of Search ................... 455/12.1, 13.2, 455/51.1, 502; 370/321, 323, 324, 401; 375/362, 356; 342/356

[56] References Cited

U.S. PATENT DOCUMENTS

| | | | |
|---|---|---|---|
| 3,611,435 | 10/1971 | Cooper | 455/13.2 X |
| 3,654,395 | 4/1972 | Schmidt | 370/323 |
| 3,982,075 | 9/1976 | Jefferis et al. | 455/13.2 X |
| 3,995,111 | 11/1976 | Tsuji et al. | 370/324 X |
| 4,218,654 | 8/1980 | Ogawa et al. | 455/13.2 X |
| 4,320,503 | 3/1982 | Acampora | 455/13.2 X |
| 4,607,257 | 8/1986 | Noguchi | 455/13.2 X |
| 4,800,560 | 1/1989 | Aoki et al. | 370/324 |
| 5,261,118 | 11/1993 | Vanderspool, II et al. | 455/12.1 X |
| 5,355,529 | 10/1994 | Linquist et al. | 455/13.2 X |
| 5,613,195 | 3/1997 | Ooi | 455/13.2 |

*Primary Examiner*—Thomas J. Mullen, Jr.
*Attorney, Agent, or Firm*—John Whelan; Michael Sales

[57] ABSTRACT

A method and system for synchronizing transmission TDMA frames in a mobile satellite communication system are disclosed herein. The method of synchronizing a transmitted frame timing in a mobile satellite communication system comprises the steps of broadcasting a frame timing offset from a satellite to a mobile terminal having a timer, receiving the frame timing offset information transmitted by the satellite in the mobile terminal, and adjusting the timer in the mobile terminal based on the timing offset information. The system includes a plurality of mobile terminals; a satellite adapted to communicate with each of the mobile terminals, the satellite having a satellite reference frame timing; at least one gateway in communication with the satellite, the gateway having a digital processor, the digital processor including a routine for calculating a frame timing offset; with the gateway transmitting the timing offset to at least one of the mobile terminals, the at least one mobile terminal receiving the timing offset and adjusting the mobile terminal transmit frame timing to compensate for the timing offset.

16 Claims, 3 Drawing Sheets

METHOD AND SYSTEM OF FRAME TIMING SYNCHRONIZATION IN TDMA BASED MOBILE SATELLITE COMMUNICATION SYSTEM

BACKGROUND OF THE INVENTION

The present invention relates generally to satellite communication systems, and more particularly to a method and system for synchronizing burst timing in a mobile satellite communication system.

Mobile satellite communication systems generally comprise at least one satellite, at least one fixed ground terminal such as a gateway, and a plurality of mobile terminals. The mobile terminals communicate with the gateway or other mobile terminals via the satellite over communication channels using time division multiple access (TDMA).

In TDMA systems, many time slots and bursts which occupy the time slots provide the communication channels for a given carrier frequency. Each burst occupies a different time slot within a TDMA frame. Each burst within the frame is separated by an inter-burst guard time to avoid interference between bursts. Because of the limited amount of frequency spectrum allocated to the satellite communication system, it is desirable to maximize the number of bursts per frame which in turn requires a minimization of the inter-burst guard time. The guard time can be minimized when the timing of each burst is carefully maintained during each burst at the proper point in time.

TDMA operation, in conjunction with the time-slot interchange switch onboard the satellite spacecraft, imposes the system requirement that all traffic routed through the onboard switch be frame and time-slot synchronous with the switch. In order to meet this requirement, all network elements transmitting toward the spacecraft must adjust their respective TDMA frame and sub-slot timing so that all TDMA frames are synchronized on arrival at the spacecraft. In some systems, the system TDMA frame timing reference must be derived from the onboard switch framing reference as it appears at the spacecraft.

Timing errors can occur in mobile satellite communications systems, however. In particular, a major cause for timing errors in such systems is doppler-induced time errors due to satellite motion. Such motion includes, for example, the satellite's "drift," or differential orbit path relative to the earth. For regular intervals of time, however, the satellite has a predictable "ephemeris," wherein the exact position of the satellite is known.

Timing synchronization is conventionally achieved at each mobile terminal through frequent periodic timing measurements at the gateway individually for each mobile terminal. Individually synchronizing each mobile terminal can consume a significant portion of the satellite spectrum, however, and occupy valuable processing power at the gateway. These problems are magnified when one considers that typical mobile satellite systems generally contain many mobile terminals (e.g., more than 500 units).

The timing synchronization implementation must achieve and maintain frame synchronization of all gateway stations and mobile terminals. Mobile terminal synchronization must be maintained throughout both mobile to gateway calls as well as mobile to mobile calls. At the mobile terminal, any timing control algorithm must appear the same for both mobile to gateway and mobile to mobile calls.

In addition, the timing control implementation must provide a high degree of immunity to traffic disruption due to single point failures.

Therefore, there is a need for a timing synchronization method which tracks satellite motion correctly for long periods of time for systems which operate with many mobile terminals connected to a signal gateway.

SUMMARY OF THE INVENTION

Accordingly, the present invention is directed to a method and system that substantially obviates one or more of the problems due to limitations and disadvantages of the related art.

To achieve these and other advantages, and in accordance with the purposes of the present invention, as embodied and broadly described, the invention is a method of synchronizing a transmitted frame timing in a mobile satellite communication system comprising the steps of broadcasting a frame timing offset from a satellite to a mobile terminal having a timer, receiving the frame timing offset information transmitted by the satellite in the mobile terminal, and adjusting the timer in the mobile terminal based on the timing offset information.

In another aspect of the invention, a method of synchronizing a transmitted frame timing in a mobile satellite communication system comprises the steps of broadcasting a frame timing offset from the gateway terminal to a mobile terminal having a timer, receiving the frame timing offset information transmitted by the gateway in the mobile terminal, and adjusting the timer in the mobile terminal based on the timing offset information.

In another aspect of the invention, a method of synchronizing a transmitted frame timing in a mobile satellite communication system comprising the steps of receiving a timing reference signal from a satellite, deriving the time of occurrence of the timing reference signal, broadcasting a control signal to the system, receiving the control signal from the system coincident with a control channel frame, deriving the time of occurrence of the control signal, comparing the time of occurrence of the timing reference signal with the time of occurrence of the control signal, and adjusting the transmitted frame timing based on the comparison.

In yet another aspect of the invention, a mobile satellite communication system is provided having a plurality of mobile terminals; a satellite adapted to communicate with each of the mobile terminals, the satellite having a satellite reference frame timing; at least one gateway in communication with the satellite, the gateway having a digital processor, the digital processor including a routine for calculating a frame timing offset; with the gateway transmitting the timing offset to at least one of the mobile terminals, the at least one mobile terminal receiving the timing offset and adjusting the mobile terminal transmit frame timing to compensate for the timing offset.

The system TDMA frame timing reference is derived from the satellite's onboard time-slot interchange switch frame reference. All network elements that transmit toward the satellite will align their respective transmit frames in time so that the beginning of the first symbol period of each frame arrives at the satellite coincident with the beginning of the first symbol period of the frame as seen at the time-slot interchange switch. The primary gateway will synchronize to the spacecraft originated reference via a closed loop Ku-band to Ku-band channel. Additional gateways in the system will synchronize to an intra-network control channel that originates at the primary gateway. Mobile terminals will synchronize to broadcast control channels transmitted to each beam. Throughout the duration of a call, mobile terminals will maintain synchronization via feedback received from its correspondent (either a gateway or another mobile terminal).

The preferred embodiment of the system provides for a significant reduction in burst time drift measurements at the gateway station and the associated significant reduction of the communications bandwidth required to transmit the drift measurement from the gateway to the mobile terminal being synchronized.

The mobile terminal implements the frame timing error correction curve as programmed. Since the satellite ephemeris is calculated in advance, the mobile terminal can also be programmed with the frame timing correction values which, when applied to the most recent synchronizations, can correct the frame timing and thus the burst timing. The requirement for data transmission is further simplified by the gateway broadcasting the median transmit burst timing, unique to each spot beam, in the control channel which serves that spot beam.

The benefit of broadcasting the median transmit burst timing is that any one of many mobile terminals (more than 500) can transmit an initial burst which is correctly timed in the system. In previous communication systems, transmitting an initial burst required an excessively wide time slot for that burst because the burst arrival time was not accurate.

It is to be understood that both the foregoing general description and the following detailed description are exemplary and explanatory and are intended to provide further explanation of the invention as claimed.

The invention, together with further objects and attendant advantages, will best be understood by reference to the following detailed description, taken in conjunction with the accompanying drawings.

DETAILED DESCRIPTION OF THE PREFERRED EMBODIMENTS

Figure 1:
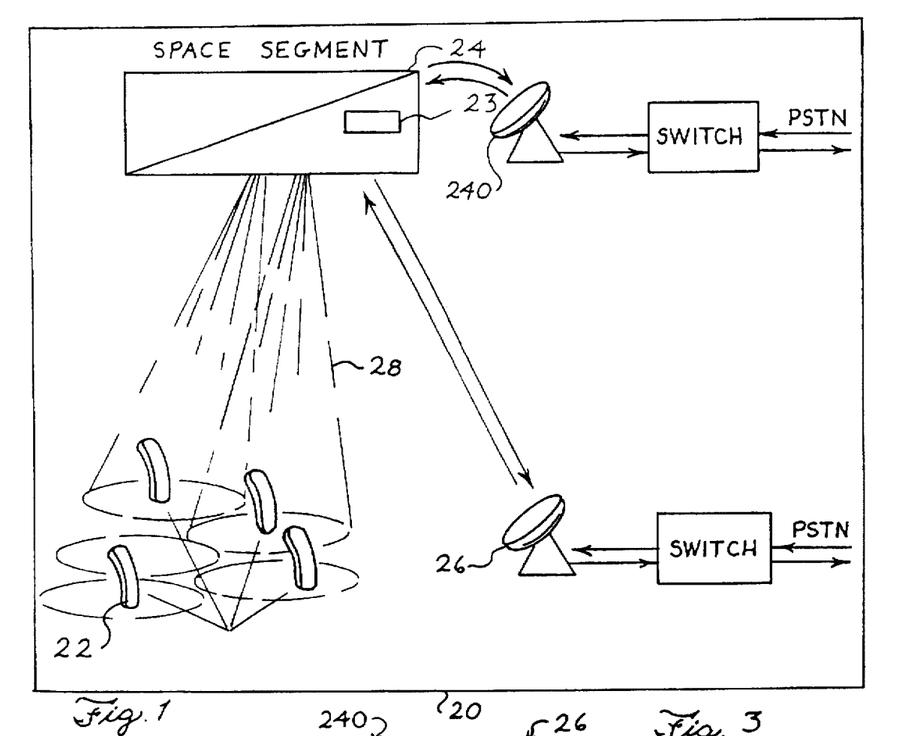
FIG. 1 is a block diagram of a preferred embodiment of a mobile satellite communication system on which is implemented the present invention.

Referring now to the drawings, and more particularly to FIG. 1, a preferred embodiment of a mobile satellite communication system 20 is illustrated. The mobile communication system 20 includes at least one mobile terminal 22, at least one space segment 24 such as a satellite, and at least one gateway earth station 26. The gateway 26 in this embodiment is designated the "primary" gateway, and other gateways in the system, such as gateway 240, are designated "secondary" gateways.

The mobile terminal 22 is preferably either a handheld phone or a vehicle mounted unit. The term mobile terminal indicates that a terminal may be used by a mobile user. It is well known in the art that a mobile terminal can also be operated in a fixed station, thus, the term mobile terminal also includes fixed terminals. The use of the term mobile terminal in this description, therefore, can also encompass fixed terminals.

The mobile terminal 22 communicates with the space segment 24 via an L-band frequency in a spot beam 28. Each spot beam 28 is associated with a predetermined geographic region. The primary gateway 26 communicates with the space segment 24 over a Ku band frequency. The space segment 24 includes transponders for translating between the L-band spot beam signals used by the mobile terminals 22 and the Ku-Band signals used by the gateways 26 and 240. The gateway 26 interfaces with a terrestrial telephony carrier, such as the public switched telephone network (PSTN), and may also interface with a cellular network. Thus, a user may place a call on the mobile terminal 22 to either a land line user over the PSTN or to a cellular phone user over the cellular network.

The space segment 24 preferably provides L-band-to-L-band TDMA bent pipe single hop communication to support mobile to mobile communication. At the space segment 24, the L-band uplink and downlink are transmitted via multiple spot beams. In the preferred embodiments, small spot size within each spot beam 28 provides a link margin allowing the satellite 24 to communicate with low power mobile terminals 22. In addition, the preferred embodiment provides for frequency reuse so that many, preferably about 16,000, users may be served using a limited amount of L-band spectrum. Preferably, the bandwidth of each spot beam 28 can be varied to accommodate changing traffic patterns.

Subscribers to the system have a unique telephone number that allows them to receive calls when they are registered in a space segment 24 coverage area. A registration procedure locates the mobile 22 within a particular spot beam 28 coverage area when the mobile terminal 22 is turned on.

The mobile terminal 22 can receive calls from any terrestrial facility by connecting the call through one of the gateway stations 26. At this point, the gateway 26 determines the location of the mobile 22 and sends a message to the mobile terminal 22 to announce the incoming call.

The system 20 utilizes low rate encoded voice transmission. Preferably, some of the mobiles 22 are dual mode, allowing voice communications either via satellite or via the local cellular system. The gateway earth station 26 provides for user mobility as the user's mobile terminal 22 moves from spot beam 28 to spot beam 28.

In addition to the communication channels carried by the space segment 24, some of the space segment resources are used for control functions. In the preferred embodiment, one or more channels in each spot beam 28 are control channels. For example, the gateway station 26 places a forward control signal in each spot beam 28 to allow synchronization of the mobile terminals 22 and to carry network control information from the gateway station 26 to the mobile terminals 22.

The forward control channels allow mobile terminals 22 to acquire a satellite carrier and identify the spot beam 28 and gateway station 26 that originates the signal. The gateway 26 uses the forward control channel to page mobiles 22 using their unique address to announce mobile terminated calls.

Each spot beam 28 preferably contains a return direction signaling channel that mobile terminals 22 use to initiate calls or to register with the gateway 26.

During a call, in-band low data rate control channels are preferably available between the mobile 22 and the gateway 26 for call supervision, power control, and to indicate call termination.

Figure 2:
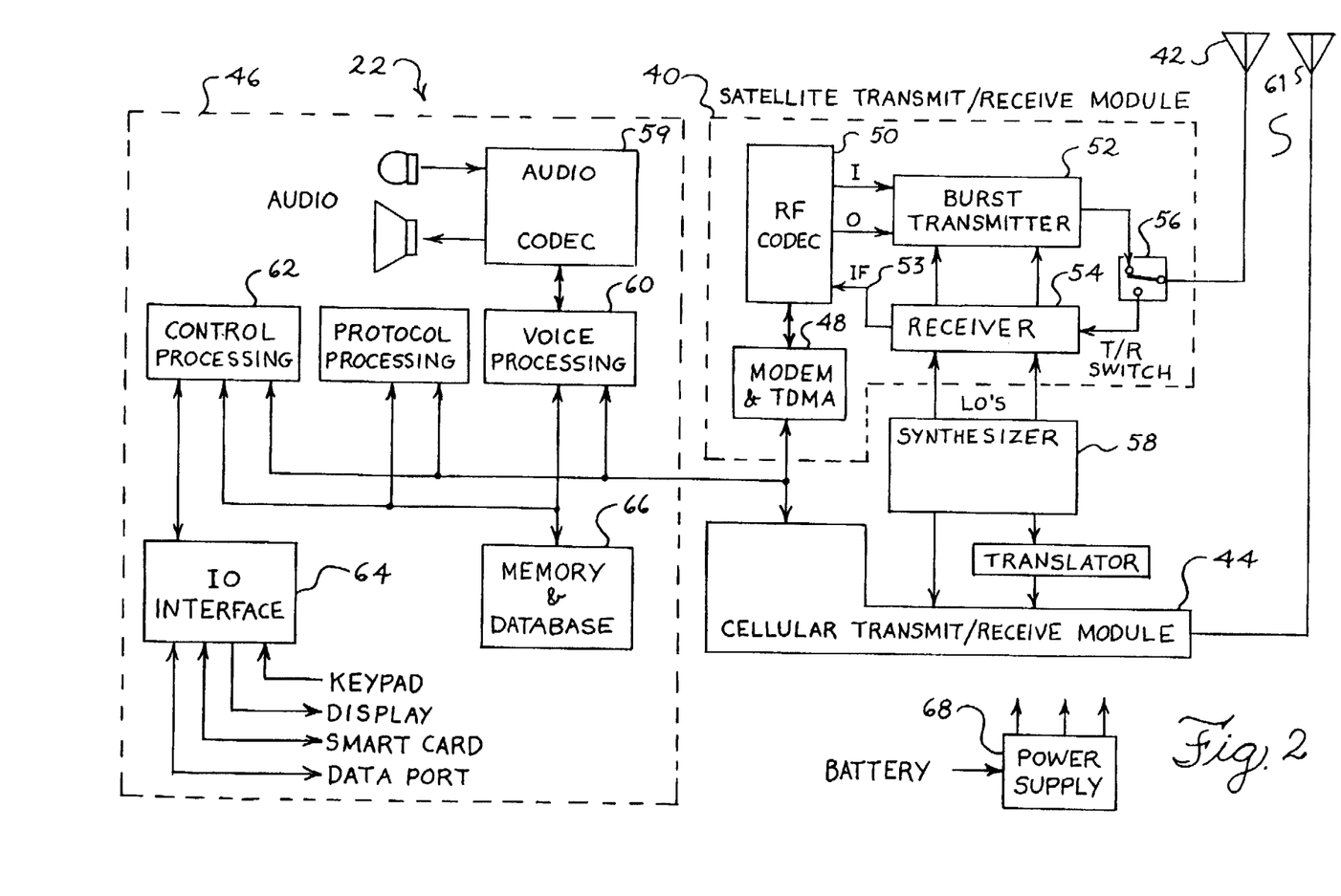
FIG. 2 is a block diagram of a preferred embodiment of a mobile terminal for use in the mobile satellite communication system of FIG. 1.

A preferred embodiment of a mobile terminal 22 is shown in FIG. 2. The mobile terminal 22 includes a satellite module 40, a satellite antenna 42, a cellular module 44, and a user interface module 46. The satellite module 40 is coupled to the user interface module 46, the cellular module 44, and the satellite antenna 42. Preferably, the satellite antenna 42 is a physically small antenna, such as a helix type antenna. The satellite module 40 includes a modem and TDMA timer 48, an RF coder and decoder 50, a burst transmitter 52, a receiver 54, and a transmit or receive (T/R) switch 56. In the preferred embodiment, the modem 48 is connected to the RF codec 50, and the RF codec 50 is connected to the burst transmitter 52 and to the receiver 54. The T/R switch 56 is connected to the burst transmitter 52, the receiver 54, and the satellite antenna 42.

Within the satellite module 40, the modem 48 converts speech or data samples to and from channel symbols using quadrature phase shift key modulation (QPSK). QPSK is preferably performed digitally by an application-specific integrated circuit or alternatively on a commercially available digital signal processor. The RF codec 50 converts channel symbols from the modem 48 into baseband I and Q signals that are transmitted to the burst transmitter 52. In the receive direction, the RF codec 50 processes an IF signal 53 from the receiver 54 for input to the modem 48.

The burst transmitter 52 converts the I and Q signals from the RF codec 50 up to a desired frequency, preferably an L-band frequency, for transmission by the first antenna 42. The receiver 54 converts a received L-band signal from the first antenna 42 into the IF signal 53 sent to the RF codec 50.

The T/R switch 56 allows the mobile terminal 22 to either transmit data or receive data. Since the preferred mobile terminal 22 does not transmit and receive simultaneously, the mobile terminal 22 does not need a large filter to isolate the transmission and reception paths. Many conventional mobile terminals require a duplexor or similar device to perform such filtering. However, conventional mobile terminals 22 with duplexors are more costly, add weight, and add approximately one-half dB of undesirable insertion loss.

The mobile terminal 22 also includes a synthesizer 58 that provides a fixed local oscillator signal for the RF codec 50. The synthesizer 58 includes a variable local oscillator for channel tuning within the satellite module 40 and generates data clock signals for the modem 48. Both the fixed local oscillator and the variable local oscillator within the synthesizer 58 may be adjusted based on commands from either the gateway 26 or from another mobile terminal 22. In the preferred embodiment, the synthesizer 58 is connected to the receiver 54 and to the cellular module 44.

The user interface module 46 includes an audio and codec unit 59, a voice processing unit 60, a controller 62, an input/output (I/O) interface 64, and a memory 66. Preferably, each element within the user interface module 46 communicates with the other user interface elements.

The audio unit 59 digitizes an audio analog signal from a telephone handset (not shown) into a digital 64 Kilobit per second (Kb/s) pulse code modulation (PCM) signal. The audio unit 59 also converts digital PCM signals into an audio signal transmitted to the telephone handset (not shown).

The voice processing unit 60 includes a voice transcoder that performs source coding to compress the digital 64 Kb/s PCM signal. Specifically, an encoder running on a programmable digital signal processor, such as a low delay CELP encoder, compresses the 64 Kb/s PCM signal into approximately a 3.6 Kb/s encoded signal. Alternatively, the encoder may be a multibased excited (MBE) type 3.6 Kb/s encoder that is well known to those skilled in the art. Both the CELP type and the MBE type encoder produce an output having a voice quality which has been measured as having a MOS of 3.2. Of course, if an application allows a lower quality voice signal, such as in a military application, even lower rate encoding could be used.

The controller 62 preferably provides a multi-tasking firmware environment for monitoring and controlling the mobile terminal hardware. The controller 62 may occupy the same processor as the voice transcoder or may optionally be disposed on a separate processor. Preferably, the controller 62 includes an I/O interface 64 that provides a communication interface with a user. The I/O interface 64 includes a keypad for data entry such as a phone number, a display, a data port, for digital communication such as a facsimile transmission, and a smart card interface as specified for GSM.

The cellular module 44 allows the mobile terminal 22 to communicate with a cellular system over a second antenna 61. The second antenna is a linearly polarized whip meeting cellular system standards and the cellular module 44 uses standard components, such as a GSM chip set, known to those skilled in the art. Preferably, the mobile terminal 22 operates in a first mode where the terminal 22 functions as a conventional cellular phone. In a second mode, the mobile terminal 22 preferably operates so that the mobile terminal 22 communicates with the satellite 24. A battery 68 is provided for portable operation of the mobile terminal 22.

The preferred mobile terminal 22 has many advantages. For example, the mobile terminal 22 provides dual-mode operation, either cellular or satellite. Also, the mobile terminal 22 provides high quality digital voice with a measured MOS score from about 3.2 to 4.0. Further, the mobile terminal 22 allows for paging and messaging, transmission at a 2400 or 4800 bps data rate via the data port, and provides a convenient cellular-like interface. Also, the mobile terminal 22 may transmit on a single channel using a single time slot within a carrier signal allowing many other mobile terminals 22 to transmit over the same carrier. Thus, the mobile terminal 22 efficiently transmits over scarce L-band frequency resources.

Figure 3:
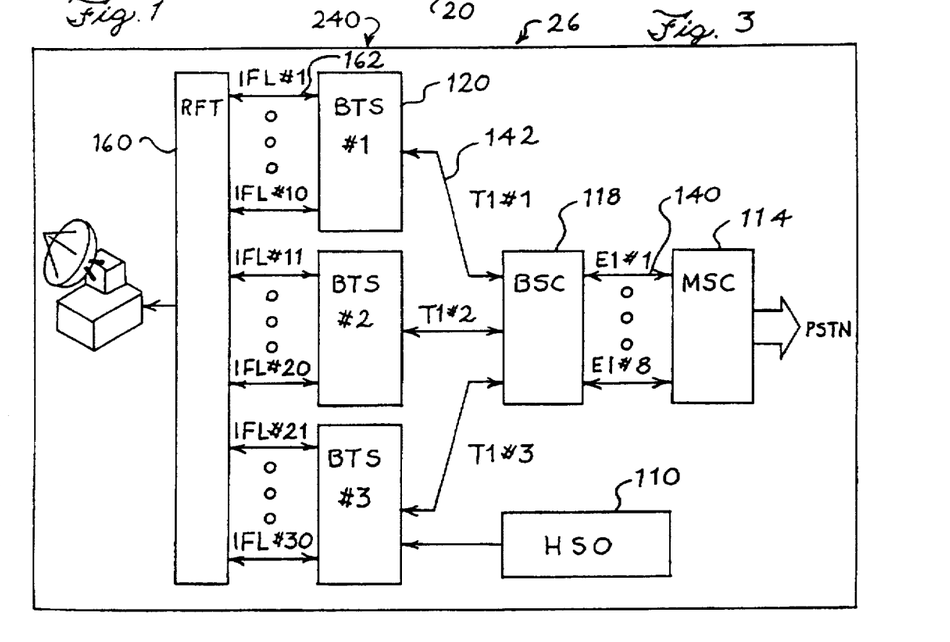
FIG. 3 is a block diagram of a preferred embodiment of a gateway earth station for use in the mobile satellite communication system of FIG. 1.

FIG. 3 is a block diagram of a preferred embodiment of a primary gateway 26 (or secondary gateway 240). The gateway 26 includes a mobile switching center (MSC) 114, a plurality of base station controllers (BSCs) 118, a plurality of base transceiver stations (BTS) 120, a radio frequency unit 160, and a high-stability oscillator (HSO) 110. The MSC 114 allows communication with the public switched telephone network (PSTN) and other mobile switching centers. The MSC 114 is connected, preferably by an A-interface 140 such as a standard E1 or E3 line, with at least one BSC 118. The BSC 118 is connected through a communication channel 142, such as a T1 line, to one or more of the base transceiver stations (BTS) 120. Each BTS 120 may communicate over an RF frequency with a mobile terminal 22. The HSO 110 provides a reference frequency signal to the BSC 118 and the BTS 120. The HSO preferably has an accuracy of $\pm 1 \times 10^8$.

A telephone "call" may be originated from the mobile terminal 22 by transmitting initialization data up to the space segment 24 over a control channel and then down to the gateway 26. In the preferred embodiment, the control channel is received over a time slot within a frequency assigned to a spot beam 28 having a coverage area surrounding the mobile terminal 22. At the gateway 26, the call is transmitted/received via an RF channel in the radio frequency unit 160 to the BTS 120 assigned to the spot beam 28 servicing the mobile terminal 22. From the BTS 120, the call is routed to the BSC 118, and then to the MSC 114. From the MSC 114, the call is routed to either the PSTN or another MSC. Thereafter, a communication channel is established through the entire gateway 26, and a subscriber using the mobile terminal 22 may communicate over the established communication channel.

Calls may also originate from either the PSTN or another MSC. Such a call enters the gateway 26 at the MSC 114 and is routed to one of the BSCs 118. The BSC 118 then pages the mobile terminal 22 via the appropriate BTS 120. After the mobile terminal 22 responds to the page from the BTS 120, a communication channel is established.

An overview of the burst timing synchronization procedure for each element in the network follows. Burst timing synchronization in the system 20 is desirable to minimize the bandwidth consumed by inter-burst time guard times and to allow non-interfering communication between geographically disparate gateway earth stations 26 and the large number of mobile terminals 22 distributed over the satellite L-band footprint. The following table illustrates the preferred allocated guard times and channel capacity for the system:

TABLE I

Subslot Configurations and Capacity

| Subslots per Channel | Guard Time (bits) | Over- head (bits) | Pay- load (bits) | Fast Channel Capacity (kbps) |
|---|---|---|---|---|
| 1 | 11.23 | 24 | 40 | 1 |
| 2 | 10.46 | 24 | 116 | 2.9 |
| 3 (Basic channel) | 9.69 | 24 | 192 | 4.8 |
| 4 | 12.93 | 24 | 264 | 6.6 |
| 5 | 16.16 | 24 | 346 | 8.4 |
| 6 | 19.39 | 24 | 408 | 10.2 |
| 7 | 10.62 | 24 | 492 | 12.3 |
| 8 | 13.85 | 24 | 564 | 14.1 |
| 9 | 17.08 | 24 | 636 | 15.9 |
| 10 | 20.31 | 24 | 708 | 17.7 |
| 11 | 11.55 | 24 | 792 | 19.8 |
| 12 | 14.78 | 24 | 864 | 21.6 |

The preferred timing synchronization implementation is designed to overcome timing errors introduced by doppler due to satellite motion.

In the preferred embodiment, a mobile terminal 22 can switch between traffic bursts from another mobile terminal 22 and control bursts from a gateway 26. In this embodiment, all signals reaching the mobile terminal 22 should have about the same timing synchronization error.

Preferably, each element in the network 20 adjusts its transmit burst timing to compensate for doppler due to satellite motion so that transmitted signals arrive at the satellite 24 with identical frame timing. Thus, signals arriving at the mobile terminal 22 theoretically should only have a timing offset from downlink doppler due to relative motion between the satellite 24 and the mobile terminal 22.

In the preferred embodiment, the timing synchronization method provides control of mobile terminals 22 during mobile to gateway calls and mobile to mobile calls. In addition, the preferred timing synchronization implementation provides a high degree of immunity to traffic disruption due to single point failures.

The preferred embodiment requires that the satellite ephemeris is available to the gateway earth stations 26 in the network 20. The geographic location of the gateway earth stations 26 and the geographic center of each spot beam 28 should be available to the gateway 26.

The satellite 24 provides a single timing reference for frame timing synchronization functions. Preferably, the satellite 24 provides adequate stability for the onboard frame timing reference without control or stabilization from the ground network. Alternatively, the satellite 24 may synchronize its frame timing reference 23 via an outbound reference burst in a Payload Response Channel (PRC) and/or an inbound Broadcast Control Channel (BCC) transmitted from a System Control Station (SCS) located on the ground. The short term stability of the free running onboard frequency reference generator 23 should allow the network 20 to continue to handle calls that do not require action by the SCS in the event of failure of the SCS until a switchover to a redundant SCS can be accomplished.

At each gateway 26 in the system 20, a local frequency reference, such as the high-stability oscillator 110, with an absolute accuracy of $\pm 1.0 \times 10^{-8}$ shall be used to derive all transmit symbol clock frequencies.

Based on the satellite ephemeris, each gateway 26 calculates a frame time shift that is introduced on the Ku-band uplink and downlink signals due to relative motion of the satellite 24 toward the gateway 26. The gateway 26 preferably adjusts its transmit frequency to compensate for the doppler introduced on the uplink. At the satellite, carriers received from the gateway 26 thus appear at the nominal frame timing.

Mobile terminal frame timing synchronization is aided by broadcasting timing correction information from one of the gateways 26 to each of the mobile terminals 22. The gateway 26 preferably determines a doppler induced error due to satellite motion toward the center of each spot beam 28. Satellite spot beam specific doppler error information is preferably broadcast over the forward control channels originating at the gateway 26. Each mobile terminal 22 in a spot beam 28 receives the satellite frame timing offset from the gateway 26. In the preferred embodiment, the satellite frame timing offset is due to satellite motion toward the geographic center of the spot beam 28.

By compensating for satellite motion-induced doppler, the mobile terminal 22 removes all but a small residual timing error due to the mobile terminal's position relative to the center of the spot beam 28. The residual error may be removed following mobile terminal transmission on a contention access channel (CAC). On receipt of the mobile terminal's CAC transmission, the gateway 26 measures the residual frame timing error and reports the error back to the mobile terminal 22 on an access response channel (ARC). After receiving and applying residual error correction information, the mobile terminal 22 compensates for frame timing errors due to satellite motion, and mobile terminal relative position errors.

Each gateway 26 preferably monitors its own transmission by receiving the Ku-band downlink. The received frame time will be offset by the satellite doppler on the downlink due to satellite motion with respect to the gateway 26.

By measuring the received frame timing and determining the offset from the nominal frame timing, the gateway 26 determines a combined downlink error. Based on the satellite ephemeris, each gateway 26 preferably calculates the average timing error introduced on the L-band uplink and downlink signals in each spot beam 28 due to relative motion of the satellite 24 toward the geographic center of each spot beam. Each gateway 26 broadcasts the satellite frame timing error on the forward control channel in each spot beam 28.

The forward control channel from the gateway 26 is received on the L-band downlink at the mobile terminal 22. At the mobile terminal 22, a received frame is offset due to satellite motion relative to the mobile terminal 22.

Thus, the total doppler seen at the mobile terminal 22 is the sum of doppler due to motion relative to the center of the spot beam and an additional component of doppler due to the mobile terminal's position with respect to the geographic center of the spot beam.

When the mobile terminal transmission is received at the satellite 24, the frame timing of the transmission includes doppler due to the relative motion of the satellite 24 and the mobile terminal 22.

The total doppler seen at the satellite 24 is the sum of doppler due to motion relative to the center of the spot beam 28 and an additional component of doppler due to the mobile terminal's position with respect to the geographic center of the spot beam.

At the controlling primary gateway 26, the mobile terminal's transmission is received with additional frame timing offset due to satellite translation error and doppler due to satellite motion with respect to the gateway 26.

Figure 4:
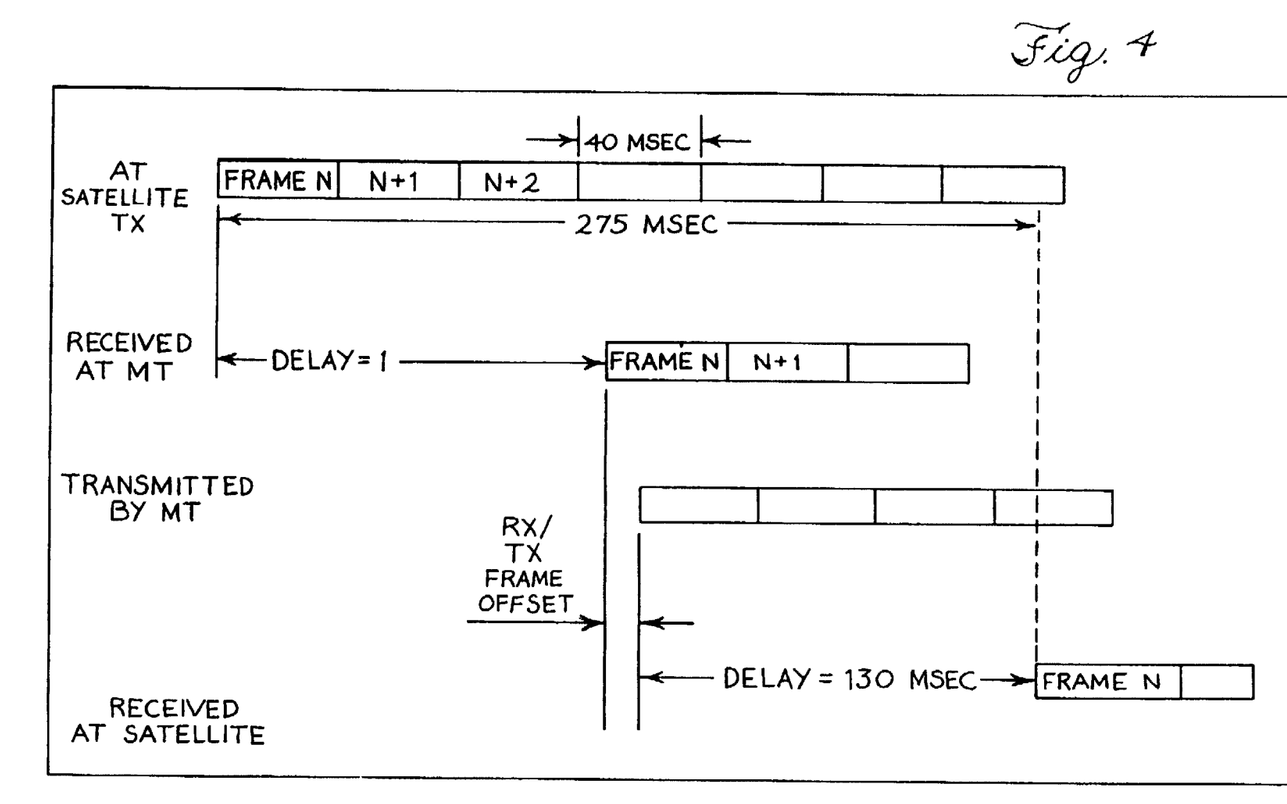
FIG. 4 is a block timing diagram showing the transmitting and receiving frame offsets positioned in the preferred embodiment of the present invention.

FIG. 4 illustrates the frame timing offset in the system. In the numbering of frames in the forward and return directions, the forward carrier is always advanced in time with respect to the return frame with the same number. At the satellite, this time advance is 275 msec as shown in FIG. 4. At the mobile terminal 22, the time advance between the received and the transmitted frame with an equal number is variable with the geographical location of the mobile terminal; however, this offset can not be less than 5 msec and shall not exceed 35 msec in the mobile terminal without duplexers since the mobile terminal transmit and receive slots shall not overlap. Slots in the basic frame (eight slots per frame organization) as well as the associated burst and channels are numbered 0 to 7, with slot 0 being the first transmitted in the frame.

Referring again to the previous figures, when comparing the timing error seen at the primary gateway 26 on the loopback control channel to the error seen on the mobile terminal's transmission, the mobile terminal signal is offset by about twice the doppler due to mobile terminal and position in the spot beam. The primary gateway 26 will see this offset on an access channel transmission received from the mobile terminal 22. The primary gateway 26 measures and reports the total error back to the mobile terminal 22 via the access response channel. In the preferred embodiment, the mobile terminal 22 then adjusts its transmit frame timing by an amount corresponding to one-half the error reported by the gateway 26.

By following the procedure described above, the mobile terminal 22 compensates for frequency offsets due to satellite motion.

During a call, mobile terminals 22 preferably continue to monitor the forward control channel from the gateway 26. The gateway 26 periodically reports changes in timing error due to satellite motion via the forward control channel. Preferably, the mobile terminals 22 observe the changing correction terms by monitoring the forward control channel, and adjust their transmit frame timing accordingly.

During a mobile to mobile call, each mobile terminal 22 preferably monitors the forward control channel from the controlling gateway 26. The gateway 26 preferably reports changes in frame timing error due to satellite motion via the forward control channel. The mobile terminals 22 observe the reported changes from the gateway 26 and accordingly adjust the transmit frame timing.

Frame timing drift, generally due to satellite motion, in a first mobile terminal 22 is preferably monitored by a second mobile terminal 22 participating in a mobile to mobile call. In the preferred embodiment, drift of the first mobile terminal 22 is determined by monitoring the relative drift between the received forward control channel and the received traffic channel at the second mobile terminal 22. By comparing the timing synchronization of the received traffic channel to the timing synchronization of the forward control channel, the second mobile terminal 22 determines a timing offset for the first mobile terminal 22. The second mobile terminal 22 reports the observed timing offset to the first mobile terminal 22, and the first mobile terminal 22 adjusts its transmit frame timing to compensate for the reported timing offset. Preferably, the above method of adjusting for frame timing in a mobile to mobile call is performed periodically throughout the duration of the call.

A more detailed description of the various embodiments of the frame timing synchronization procedures is set forth below.

In one embodiment of the present invention, timing control is derived directly from the satellite's frame reference. The frame reference is derived from the satellite's free running payload master frequency reference. The payload master frequency reference provides long-term accuracy to one part in $10^{-8}$. The frame reference is transmitted to the primary gateway 26 imbedded in the payload response channel (PRC), which provides command acknowledgment and payload status response to the system control subsystem (SCS). The SCS is a portion of the ground-based gateway that performs the timing broadcast and repeating steps of the present invention. The SCS may be implemented within any particular gateway or ground network. The PRC is organized as a 40 millisecond framed channel with a unique word defining the start of the frame. The leading edge of the first symbol of the unique word is precisely related to the time-slot interchange switch frame reference. The data rate used on the PRC may be higher than the rate used for communication channels to provide better start of frame time resolution.

At the primary gateway 26, the SCS will monitor the PRC and extract the 25 Hz frame reference. The SCS will then align its transmitted frame to the received frame reference. Precise time alignment is achieved and maintained by monitoring the transmitted signal (as it is received on the Ku-band downlink) and comparing the received frame timing to the reference timing found on the PRC. The SCS will then adjust the frame timing of the transmitted channel until the received channel is precisely aligned with the received PRC. The primary gateway 26 will maintain all transmitted frames synchronous with the transmitted loopback channel.

From the PRC, the SCS will derive a receive timing reference signal, Expected Time of Arrival (E-TOA). The signal E-TOA shall be coincident with the beginning of the first symbol period of each frame as received at the primary gateway 26 antenna flange. After deriving E-TOA from the PRC, the SCS will begin transmitting a Ku-band to Ku-band intra-network communications system control channel. Initially, the first symbol of the transmitted control channel frame will be offset from E-TOA by a time that is determined by the SCS based on the geographic location of the primary gateway 26 and the satellite's orbital position (as determined by ephemeris data provided by the TT&C system). The SCS will monitor its own transmission, as it is received on the Ku-band downlink. The SCS will derive a signal, Actual Time of Arrival (A-TOA) from the monitored downlink channel. The signal A-TOA shall be coincident with the beginning of the first symbol period of the control channel frame as received at the primary gateway 26 antenna flange. The SCS will compare the time of occurrence of A-TOA to the time of occurrence of E-TOA. The SCS will then adjust the offset of the transmitted frame relative to E-TOA until the A-TOA is coincident with E-TOA.

Other gateways, such as secondary gateway 240, in the mobile satellite system will then receive the intra-network control channel from the primary gateway 26. Each secondary gateway will extract a frame reference from the received intra-network control channel. The gateway 240 will then align its transmitted intra-network response channel frame to the received frame reference. Precise time alignment is achieved and maintained by feedback provided by the SCS. At the primary gateway 26, the SCS will receive the response channel on the Ku-band downlink and compare the received frame timing to the reference timing found on the PRC. The SCS will then instruct the gateway 26 (where the response channel originates) to either advance or retard its transmitted response channel frame until the received response channel is precisely aligned with the received PRC. Each gateway in the network will maintain all transmitted frames synchronous with the intra-network response channel frame.

In the preferred embodiment, each gateway in the mobile satellite communication network will acquire and synchronize to the intra-network control channel transmitted by the SCS at the primary gateway 26. After extracting the frame reference from the control channel, each secondary gateway 240 may then transmit a Ku-band to Ku-band intra-network communications system response channel to the SCS. Initially, the first symbol of the transmitted response channel frame will be offset from the frame reference derived from the control channel by a time that is determined by the SCS based on the geographic location of the gateway and by the satellite's orbital position. At the primary gateway 26, the SCS will receive the response channel on the Ku-band downlink and derive a signal, A-TOA, where A-TOA is coincident with the beginning of the first symbol period of the response channel frame as received at the primary gateway 26 antenna flange. The SCS will compare the time of occurrence of A-TOA to the time of occurrence of E-TOA. The SCS will then instruct the gateway (via an intra-network control channel) to either advance or retard its transmitted response channel frame until A-TOA is coincident with E-TOA and the received response channel is precisely aligned with the PRC received from the satellite.

In an alternative embodiment of the invention, all gateways can employ a loopback timing synchronization approach where an Expected Time of Arrival (E-TOA) signal is derived from the intra-network control channel transmitted by the SCS at the primary gateway 26. The gateway will then transmit its response channel toward the satellite. Initial timing will be dependant on the satellite's orbital position and the location of the gateway as described above. Precise alignment is achieved and maintained by receiving the transmitted response channel, and deriving an A-TOA signal for comparison to E-TOA. The transmitted signal timing is then adjusted until A-TOA is coincident with E-TOA. The gateway must then confirm that all channels transmitted toward the satellite are synchronous with the intra-network communications system response channel.

The network timing reference is the satellite's time-slot interchange switch frame reference transmitted by the satellite on the Ku-band downlink payload response channel. Since mobile terminals 22 receive only the L-band down link, mobile terminal 22 synchronization must be assisted by the SCS at the primary gateway 26. The SCS will transmit a Broadcast Control Channel (BCC) in each spot beam. The BCC will be frame synchronous with the satellite time-slot interchange switch frame as described in previous sections above. Mobile terminals 22 will derive their timing reference from the received BCC. Initially, the mobile terminal 22 will transmit toward the satellite with timing derived from the received BCC. Precise time alignment is achieved by feedback provided by the SCS. The SCS will receive the mobile terminal's transmission on the contention access channel (CAC) and compare the received frame timing to the reference timing found on the PRC. The SCS will then instruct the mobile terminal 22 to either advance or retard its transmitted frame until the received CAC is precisely aligned with the received PRC. Mobile terminal timing is maintained throughout the duration of a call with the aid of feedback from the corresponding side of the call.

Each mobile terminal 22 in the mobile satellite network will acquire and synchronize to the BCC in its respective spot beam. Each mobile will extract a frame reference signal E-TOA from the received broadcast control channel. For initial access to the system, the mobile terminal 22 will transmit on the CAC. The start of the first symbol of CAC transmit frame will be offset from E-TOA by a time that is dependant on the geographic location of the spot beam and on the satellite's orbital position. The required initial access timing offset will be calculated by the SCS and broadcast on the BCC. The initial access offset broadcast by the SCS will be the calculated mean offset for the spotbeam, assuming uniform distribution of mobile terminals 22 within the beam.

As mobile terminals 22 access the CAC, the SCS will compare the time of arrival of the burst received on the CAC to the expected position in the frame and will transmit a correction back to the mobile terminal 22 via the Access Response Channel (ARC). The mobile terminal 22 will adjust its transmitted frame timing accordingly. During a call, timing reference tracking is accomplished by correction information received by the corresponding gateway or mobile terminal as described in the sections that follow.

During mobile to gateway (and gateway to mobile) calls, mobile terminals 22 will preferably receive Tx frame timing correction information from the corresponding gateway. The gateway will derive an actual time of arrival (A-TOA) signal from the received transmission. The gateway will then compare the received mobile terminal burst A-TOA to the expected TOA and will transmit timing correction back to the remove via inband signalling on the traffic channel.

For mobile to mobile calls, mobile terminals 22 involved in such calls must receive frame timing correction information from the corresponding mobile terminal. This is necessary in order to satisfy the requirement that the timing control implementation be similar for all types of calls. Each mobile terminal 22 will derive an expected time, of arrival (E-TOA) reference signal from the BCC. The signal, E-TOA will be coincident with the start of the first symbol of the BCC frame. Each mobile terminal 22 will also derive an actual time of arrival signal (A-TOA) from the traffic channel frame received from its correspondent. For mobile to mobile calls, each mobile terminal 22 will compare the received traffic burst A-TOA to E-TOA derived from the BCC. Each mobile terminal 22 will then transmit advance or retard timing correction back to the corresponding mobile terminal via inband signalling on the traffic channel.

Alternatively, the network timing reference in the system may originate from the primary gateway 26, and become distributed to the other elements of the system via the BCC.

Of course, it should be understood that a wide range of changes and modifications can be made to the preferred embodiment described above. For example, although the preferred embodiment focuses on telephony communication in a mobile telephone system, the preferred method may also be used in any system requiring multiple access of the same carrier frequency. Thus, it is intended that the foregoing detailed description be regarded as illustrative rather than limiting and that it be understood that it is the following claims, including all equivalents, which are intended to define the scope of this invention.

What is claimed is:

1. A method of synchronizing a transmitted frame timing in a mobile satellite communication system comprising the steps of:

receiving a timing reference signal from a satellite;
   deriving the time of receiving of said timing reference signal;
   adjusting the time of receiving of said timing reference signal based on satellite ephemeris information;
   broadcasting a control signal to said system;
   receiving said control signal from said system;
   deriving the time of receiving of said control signal;
   comparing the adjusted time of receiving of said timing reference signal with the time of receiving of said control signal; and
   adjusting said transmitted frame timing based on said comparison.

2. The method as recited in claim 1 wherein said step of adjusting said transmitted frame timing based on said comparison further comprises adjusting the offset of the transmitted frame relative to the timing reference signal until said control signal is coincident with said timing reference signal.

3. A method of synchronizing a transmitted frame timing in a mobile satellite communication system comprising the steps of:

broadcasting a frame timing offset from a satellite to mobile terminal having a timer;
   receiving said frame timing offset information transmitted by said satellite in said mobile terminal; and
   adjusting said timer in said mobile terminal based on said timing offset information and satellite ephemeris information stored in said mobile terminal.

4. A method of synchronizing a transmitted frame timing in a mobile satellite communication system comprising the steps of:

broadcasting a frame timing offset from a gateway terminal to a mobile terminal having a timer;
   receiving said frame timing offset information transmitted by said gateway in said mobile terminal; and
   adjusting said timer in said mobile terminal based on said timing offset information and satellite ephemeris information stored in said mobile terminal.

5. The method of claim 4, further comprising the step of: adjusting a transmit frame timing of said mobile terminal to compensate for said timing offset.

6. The method of claim 5, further comprising the steps of:
   transmitting a first signal from said mobile terminal to said gateway;
   receiving a mobile terminal frame timing offset from said gateway; and
   adjusting said transmit frame timing in said mobile terminal to compensate for said mobile terminal timing offset.

7. The method of claim 6, wherein said mobile terminal timing offset comprises mobile terminal position offset in a spot beam.

8. The method of claim 4, further comprising the steps of:
   placing a call between said mobile terminal and said gateway;
   measuring a mobile terminal timing offset at said gateway;
   reporting said mobile terminal timing offset to said mobile terminal;
   adjusting said transmit frame timing in said mobile terminal to compensate for said mobile terminal timing offset.

9. The method of claim 8, further comprising the step of:
   adjusting a transmit frame timing of said mobile terminal to compensate for said mobile terminal timing offset.

10. The method of claim 4, wherein said timing offset information comprises satellite motion offset.

11. The method of claim 4, further comprising the step of transmitting a doppler compensated signal from said gateway to said satellite.

12. The method of claim 4, further comprising the steps of
   transmitting a first signal from said gateway to a satellite;
   translating the time of arrival of said first signal to produce a second signal;
   transmitting said second signal from said satellite to a mobile terminal;
   monitoring the transmission of the second signal at said gateway;
   calculating a doppler offset for said first signal and for said second signal at said gateway; and
   measuring a satellite doppler offset.

13. The method of claim 12, further comprising the step of:
   adjusting a transmit frame timing of said mobile terminal to compensate for said mobile terminal frame timing offset.

14. A mobile satellite communication system comprising:
   a plurality of mobile terminals;
   a satellite adapted to communicate with each of said mobile terminals, said satellite having a satellite reference frame timing;
   at least one gateway in communication with said satellite, said gateway having a digital processor, said digital processor including a routine for calculating a frame timing offset;
   said gateway transmitting said timing offset to at least one of said mobile terminals, said at least one mobile terminal receiving said timing offset and adjusting a mobile terminal transmit frame timing to compensate for said timing offset.

15. The system of claim 14, wherein said mobile terminal transmit frame timing offset comprises mobile terminal position offset from the center of a spot beam.

16. The system of claim 14, wherein said satellite communicates with said mobile terminals by transmitting and receiving signals over a plurality of spot beams, each spot beam having a coverage region and at least one control channel;
   said routine calculates a plurality of timing offsets, each calculated timing offset associated with one of said spot beams and calculated based on the position of said coverage region for said associated spot beam; and
   said gateway transmits said plurality of timing offsets over said control channels to said mobile terminals.

* * * * *